US012504521B2

United States Patent
Robertson, Jr. et al.

(10) Patent No.: US 12,504,521 B2
(45) Date of Patent: Dec. 23, 2025

(54) SENSOR ASSEMBLY WITH VELOCITY STACK

(71) Applicant: Ford Global Technologies, LLC, Dearborn, MI (US)

(72) Inventors: Michael Robertson, Jr., Garden City, MI (US); Tyler D. Hamilton, Farmington, MI (US); Anthony Michael Regalbuto, Highland, MI (US); Rashaun Phinisee, Ypsilanti, MI (US); Kunal Chaudhari, Westland, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1121 days.

(21) Appl. No.: 17/488,412

(22) Filed: Sep. 29, 2021

(65) Prior Publication Data

US 2023/0101656 A1 Mar. 30, 2023

(51) Int. Cl.
*B60S 1/54* (2006.01)
*G01S 7/481* (2006.01)
(Continued)

(52) U.S. Cl.
CPC ............... *G01S 7/497* (2013.01); *B60S 1/54* (2013.01); *G01S 7/4813* (2013.01); *G01S 17/931* (2020.01); *G01S 2007/4977* (2013.01)

(58) Field of Classification Search
CPC ........ F04D 29/40; F04D 29/403; F04D 29/42; F04D 29/4206; F04D 29/4213;
(Continued)

(56) References Cited

U.S. PATENT DOCUMENTS

| 1,910,225 A | * | 5/1933 | Anderson | ............. | F04D 29/462 |
| | | | | | 415/160 |
| 2003/0049141 A1 | * | 3/2003 | Masters | ............. | F04D 29/4213 |
| | | | | | 417/366 |

(Continued)

FOREIGN PATENT DOCUMENTS

| CN | 111660949 A | 9/2020 |
| DE | 102018210057 A1 | 12/2019 |
| WO | 2015174507 A1 | 11/2015 |

OTHER PUBLICATIONS

Admodesi, Velocity Stack and Fan Guard for 40mm Fan (round), Mar. 29, 2017, Thingiverse, https://www.thingiverse.com/thing:2211780 (Year: 2017).*

(Continued)

*Primary Examiner* — Omair Chaudhri
(74) *Attorney, Agent, or Firm* — Frank A. MacKenzie; Brooks Kushman P.C.

(57) ABSTRACT

A sensor assembly includes a housing defining a chamber. A sensor is disposed in the chamber and has a lens. An air nozzle is aimed to direct air across the lens. A blower is disposed in the chamber and in fluid communication with the air nozzle. A velocity stack is mounted to the blower and includes an air foil and an outer wall spaced from the air foil and extending entirely around the air foil. The air foil and the outer wall define a channel therebetween. The blower is in fluid communication with the chamber through the channel.

20 Claims, 8 Drawing Sheets

(51) Int. Cl.
*G01S 7/497* (2006.01)
*G01S 17/931* (2020.01)

(58) Field of Classification Search
CPC ............ F04D 29/4226; F04D 29/4253; F04D 29/44–444; F04D 29/462; F04D 29/52; F04D 29/522; F04D 29/547; F04D 29/66; F04D 29/662; F04D 29/666; F04D 29/667; F04D 29/703
See application file for complete search history.

(56) References Cited

U.S. PATENT DOCUMENTS

| | | | |
|---|---|---|---|
| 2005/0002782 A1* | 1/2005 | Nikpour | F04D 27/0207 415/208.1 |
| 2007/0217906 A1* | 9/2007 | Smiley, III | F04D 29/441 415/200 |
| 2009/0208331 A1* | 8/2009 | Haley | F25B 1/10 415/191 |
| 2010/0147244 A1* | 6/2010 | Tassinari | F02B 27/005 123/184.56 |
| 2012/0162428 A1 | 6/2012 | Wee | |
| 2015/0013945 A1* | 1/2015 | Choi | F24F 1/0022 415/203 |
| 2016/0123357 A1* | 5/2016 | Oun | F02D 9/1035 29/890.08 |
| 2016/0152327 A1* | 6/2016 | Bertels | F04D 25/066 415/121.3 |
| 2019/0337489 A1* | 11/2019 | Baldovino | G01N 21/15 |
| 2020/0094783 A1* | 3/2020 | Dubey | B60S 1/0844 |
| 2021/0031729 A1* | 2/2021 | Matsunaga | F04D 29/4246 |
| 2021/0129800 A1* | 5/2021 | Park | B60S 1/52 |
| 2021/0262485 A1* | 8/2021 | Kosaka | F04D 29/282 |
| 2022/0111822 A1* | 4/2022 | Matsunaga | B08B 5/02 |
| 2024/0181997 A1* | 6/2024 | Rachow | B60S 1/56 |

OTHER PUBLICATIONS

Cmh, Velocity stack for Noctua 40mm fan NF-A4x10, Feb. 18, 2019, Thingiverse, https://www.thingiverse.com/thing:3436360 (Year: 2019).*

Romain1330, Fan Guard/Duct—Velocity Stack, 40MM for All Printer, Feb. 1, 2021, https://cults3d.com/en/3d-model/tool/fan-guard-duct-velocity-stack-40mm-for-all-printer (Year: 2021).*

* cited by examiner

SENSOR ASSEMBLY WITH VELOCITY STACK

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

A sensor assembly includes a housing defining a chamber. A sensor is disposed in the chamber and has a lens. An air nozzle is aimed to direct air across the lens. A blower is disposed in the chamber and in fluid communication with the air nozzle. A velocity stack is mounted to the blower and includes an air foil and an outer wall spaced from the air foil and extending entirely around the air foil. The air foil and the outer wall define a channel therebetween. The blower is in fluid communication with the chamber through the channel.

The air foil may extend about a first axis and the outer wall may extend about a second axis. The first axis may be offset from the second axis. The air foil may have a rounded cone shape centered on the first axis.

The blower may include a rotor rotatable about a rotor axis. The air foil may be centered on the rotor axis. The outer wall may extend about a second axis offset from the rotor axis.

The blower may include an intake extending annularly about an intake axis offset from the rotor axis. The intake may extend entirely around the air foil and the rotor. The outer wall may be centered on the intake axis. The outer wall may extend circumferentially about the intake.

The channel may extend annularly about the air foil. The channel may be substantially aligned with the intake about the air foil.

The outer wall may be connected to the blower and the air foil may be spaced from the blower.

The blower may include an exhaust having a cover. The velocity stack may be connected to the cover.

The velocity stack may include a plurality of ribs extending across the channel from the air foil to the outer wall. The ribs may be spaced from each other about the air foil.

The outer wall may include a bottom connected to the blower and a top spaced from the blower along an axis. The channel may extend from the bottom towards the top of the outer wall. The air foil may include a tip disposed between the top and the bottom of the outer wall along the axis.

The channel may extend annularly about the air foil.

The air nozzle may be shaped to discharge air in a flat-fan pattern.

The sensor may be spaced from the blower. The sensor assembly may include a duct disposed in the chamber and being coupled to the blower and the air nozzle.

The sensor assembly may include a second sensor disposed in the chamber and having a second lens. The second sensor may be spaced from the sensor and the blower. The sensor assembly may include a second air nozzle aimed to direct air across the second lens. The sensor assembly may include a second duct disposed in the chamber and extending from the blower to the second air nozzle. The second duct may be coupled to the blower and the second air nozzle.

The sensor assembly may include a fluid nozzle aimed to direct fluid across the lens. The fluid nozzle may be circumferentially spaced from the air nozzle about the lens.

With reference to the Figures, wherein like numerals indicate like parts throughout the several views, a sensor assembly 12 for a vehicle 10 includes a housing 14 defining a chamber 16. A sensor 18 is disposed in the chamber 16 and has a lens 20. An air nozzle 22 is aimed to direct air across the lens 20. A blower 24 is disposed in the chamber 16 and is in fluid communication with the air nozzle 22. A velocity stack 26 is mounted to the blower 24 and includes an air foil 28 and an outer wall 30 spaced from the air foil 28 and extending entirely around the air foil 28. The air foil 28 and the outer wall 30 defines a channel 32 therebetween. The blower 24 is in fluid communication with the chamber 16 through the channel 32.

The sensor assembly 12 uses fluid for cleaning the lens 20 of the sensor 18, which can improve the quality of data gathered by the sensor 18. Additionally, the sensor assembly 12 uses air for cleaning and/or drying the lens 20 of the sensor 18, e.g., by pushing debris and/or liquid droplets off the sensor 18. Advantageously, the velocity stack 26 is mounted to the blower 24 to direct air flow from the chamber 16 into the blower 24. Specifically, the channel 32 compresses the air flow into the blower 24 thereby stabilizing the air flow and increasing the velocity of the air flow, which improves the efficiency of the blower 24 and allows air to exit the air nozzle 22 at a velocity sufficient to clean and/or dry the lens 20 of the sensor 18.

Figure 1:
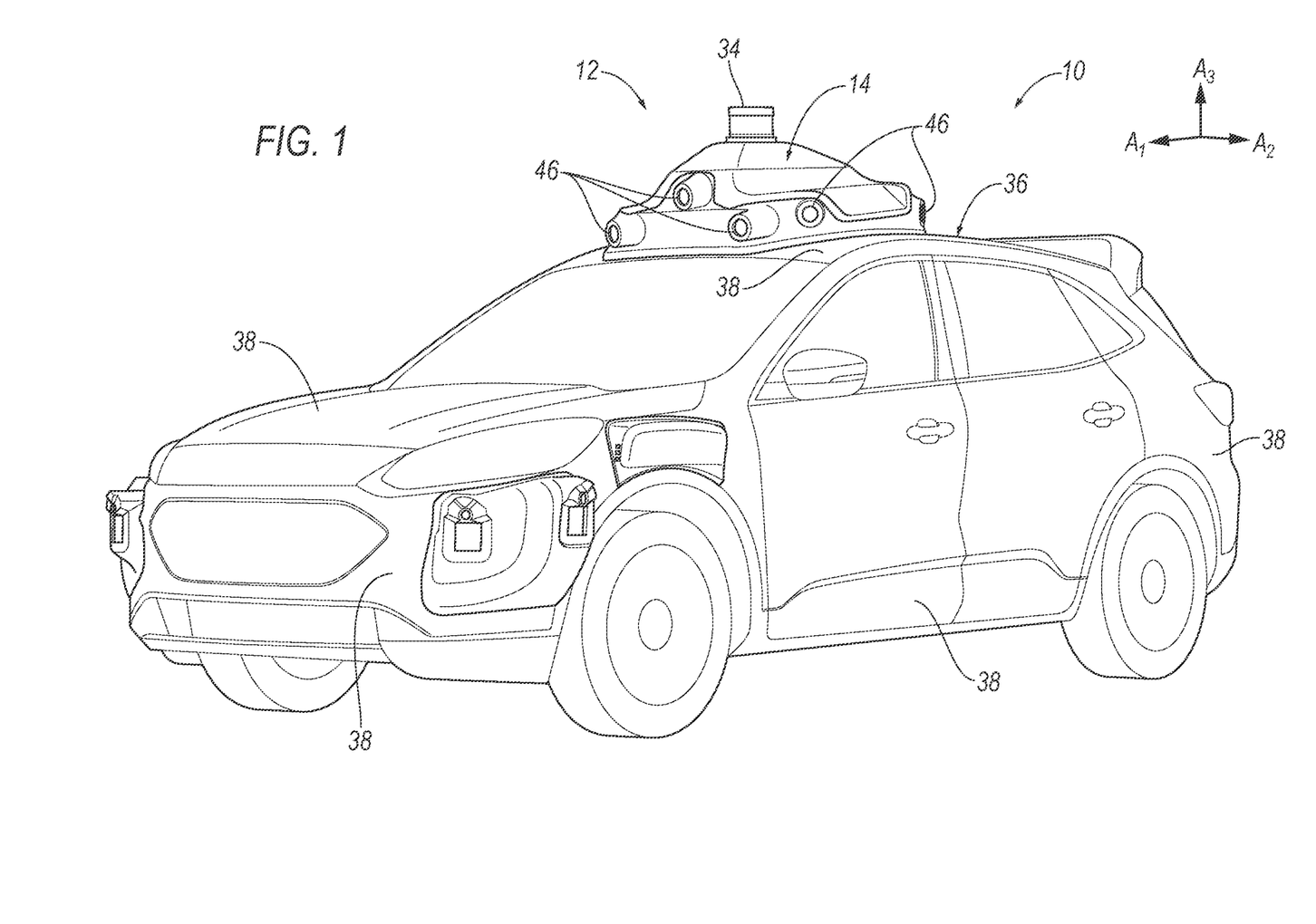
FIG. 1 is a perspective view of a vehicle including an example sensor assembly mounted to a roof.

With reference to FIG. 1, the vehicle 10 may be any passenger or commercial automobile such as a car, a truck, a sport utility vehicle, a crossover, a van, a minivan, a taxi, a bus, etc.

The vehicle 10 defines a longitudinal axis $A_1$, e.g., extending between a front and a rear of the vehicle 10. The vehicle 10 defines a lateral axis $A_2$, e.g., extending between a left side and a right side of the vehicle 10. The vehicle 10 defines a vertical axis $A_3$, e.g., extending between a top and a bottom of the vehicle 10. The longitudinal axis $A_1$, the lateral axis $A_2$, and the vertical axis $A_3$ are perpendicular to each other.

The vehicle 10 may be an autonomous or semi-autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from one or more sensors 18, as well as a scanning sensor 34 described below. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 36. The vehicle 10 may be of a unibody construction, in which a frame and the body 36 of the vehicle 10 are a single component. The vehicle 10 may, alternatively, be of a body-on-frame construction, in which the frame supports the body 36 that is a separate component from the frame. The frame and body 36 may be formed of any suitable material, for example, steel, aluminum, etc.

The body 36 includes body panels 38 partially defining an exterior of the vehicle 10. The body panels 38 may present a class-A surface, e.g., a finished surface exposed to view by a customer and free of unaesthetic blemishes and defects. The body panels 38 include, e.g., a roof, etc.

The housing 14 is attachable to the vehicle 10, e.g., to one of the body panels 38 of the vehicle 10, e.g., the roof. The sensors 18 and the scanning sensor 34 are supported by and/or disposed in the housing 14. The housing 14 may be shaped to be attachable to the roof, e.g., may have a shape matching a contour of the roof. The housing 14 may be attached to the roof, which can provide the sensors 18 and the scanning sensor 34 with an unobstructed field of view of an area around the vehicle 10. The housing 14 may be formed of, e.g., plastic or metal.

Figure 2:
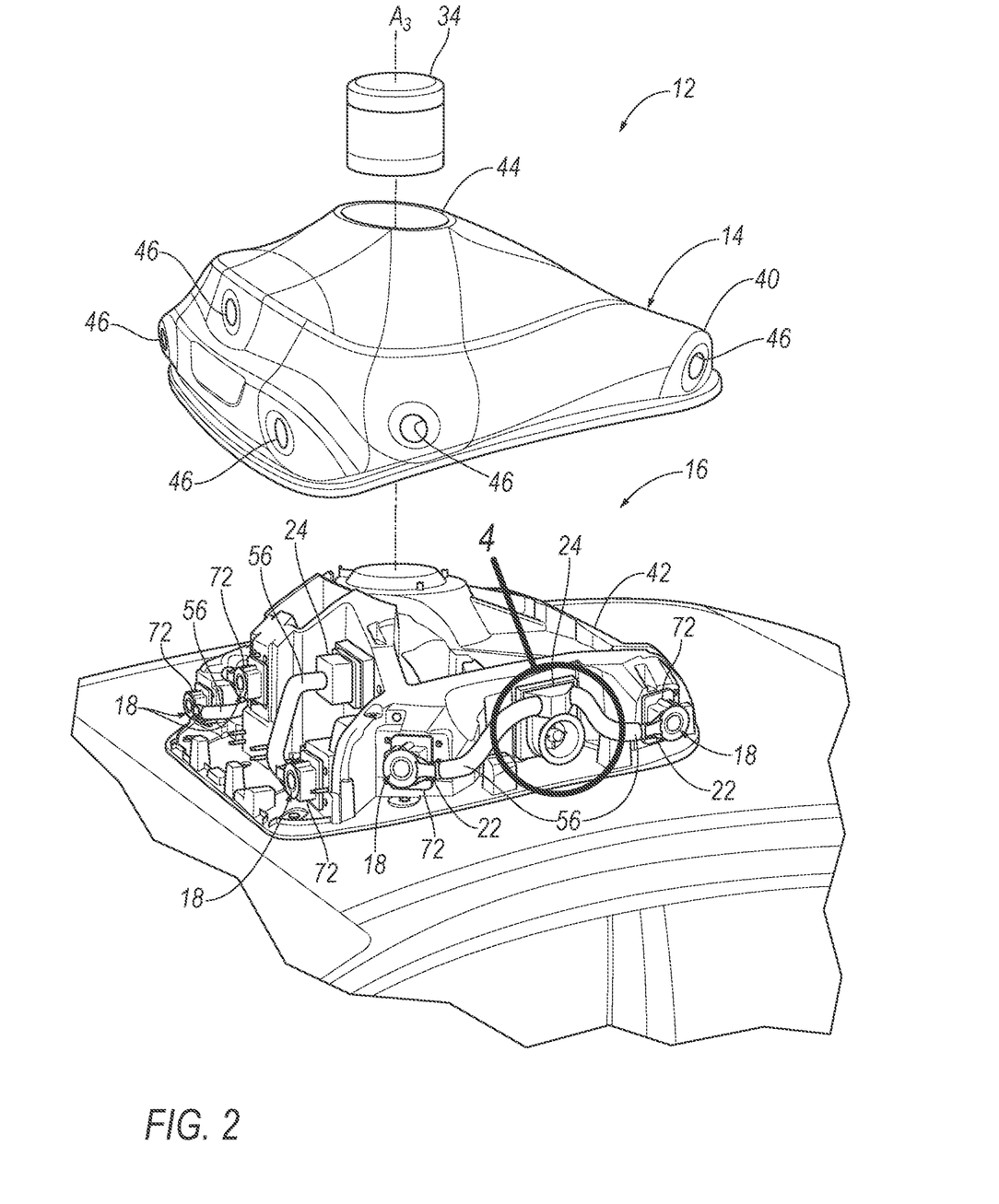
FIG. 2 is an exploded view of the sensor assembly including a housing lower piece and a housing upper piece.

With reference to FIG. 2, the housing 14 includes a housing upper piece 40 and a housing lower piece 42. The housing upper piece 40 and the housing lower piece 42 are shaped to fit together, with the housing upper piece 40 fitting on top of the housing lower piece 42. The housing upper piece 40 covers the housing lower piece 42. The housing 14 may enclose and define the chamber 16; for example, the housing upper piece 40 and the housing lower piece 42 may enclose and define the chamber 16. The housing 14 may shield contents of the chamber 16 from external elements such as wind, rain, debris, etc.

The housing upper piece 40 includes a central opening 44 that exposes the housing lower piece 42. The central opening 44 is round, e.g., has a circular or slightly elliptical shape. The housing upper piece 40 and the housing lower piece 42 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 40 and the housing lower piece 42 may be stamped or molded as a single piece.

With continued reference to FIG. 2, the housing upper piece 40 may include apertures 46. The apertures 46 are holes in the housing upper piece 40 leading from the chamber 16 into the ambient environment. That is, the apertures 46 extend through the housing upper piece 40. The apertures 46 may be any suitable shape, e.g., circular. The housing upper piece 40 includes one aperture 46 for each sensor 18. Each sensor 18 has a field of view received through the respective aperture 46. For example, the sensors 18 may extend into the respective apertures 46. In such an example, the aperture 46 may be concentric about a portion of the sensor 18, e.g., the lens 20.

Figure 3:
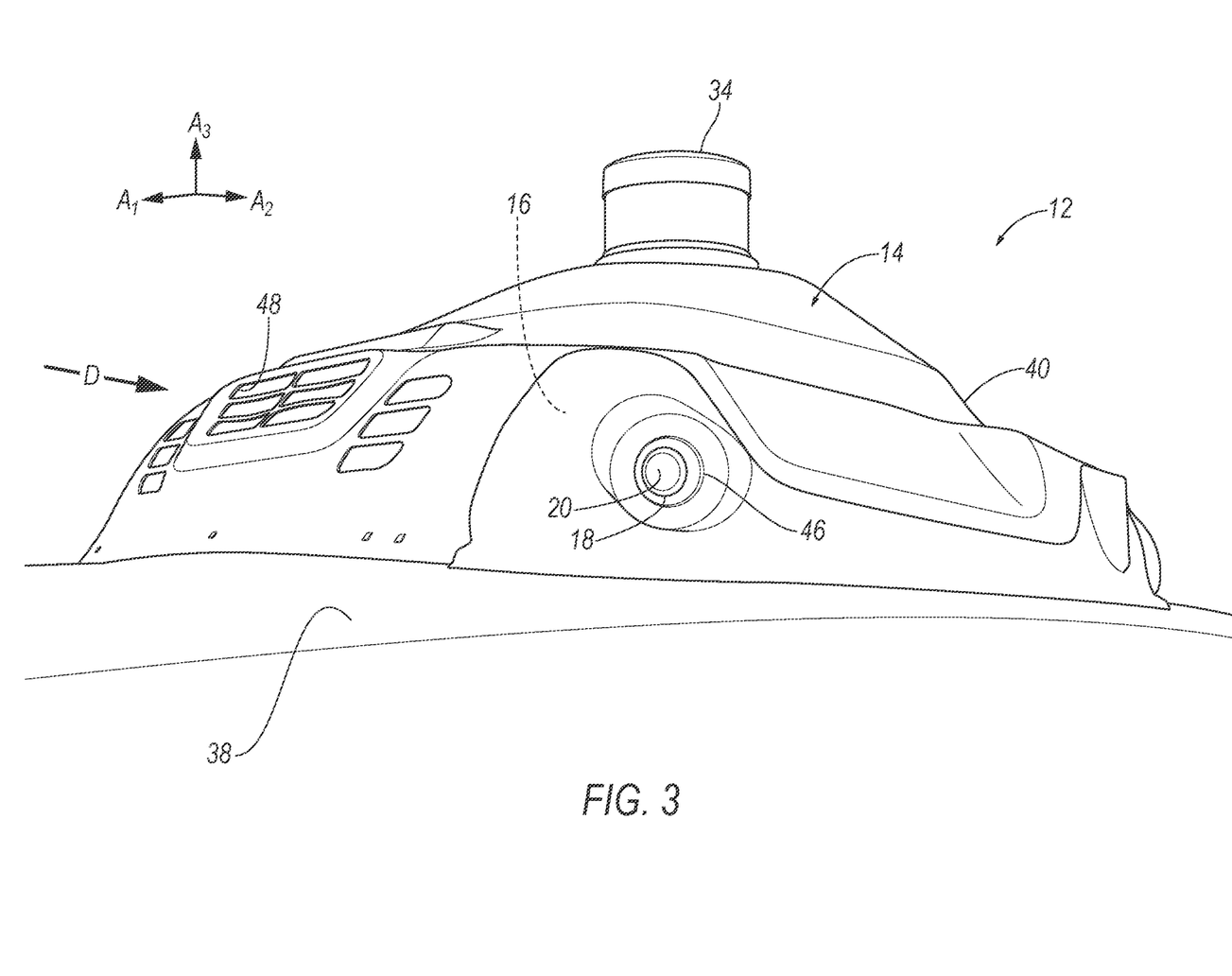
FIG. 3 is a rear perspective view of the sensor assembly on the vehicle.

Turning now to FIG. 3, the housing upper piece 40 may include the air inlet 48. The air inlet 48 permits air to enter the chamber 16 of the housing 14. The air inlet 48 may include an opening through which air may travel, baffles that direct the air, and/or other suitable structure. The air inlet 48 may be open to the external environment. The air inlet 48 may be in fluid communication with the chamber 16, i.e., such that air may flow in a direction D from outside the chamber 16, through the air inlet 48, and into the chamber 16. The air inlet 48 may include a filter (not shown). The filter removes solid particulates such as dust, pollen, mold, dust, and bacteria from air flowing through the filter. The filter may be any suitable type of filter, e.g., paper, foam, cotton, stainless steel, oil bath, etc. The air inlet 48 may face any direction relative to forward travel of the vehicle 10. For example, the air inlet 48 may face in a vehicle-rearward direction. As another example, the air inlet 48 may face in a vehicle-forward direction, e.g., such that ram air entering the air inlet 48 pressurizes the chamber 16. The housing upper piece 40 may include any suitable number of air inlets 48, i.e., one or more.

Figure 4:
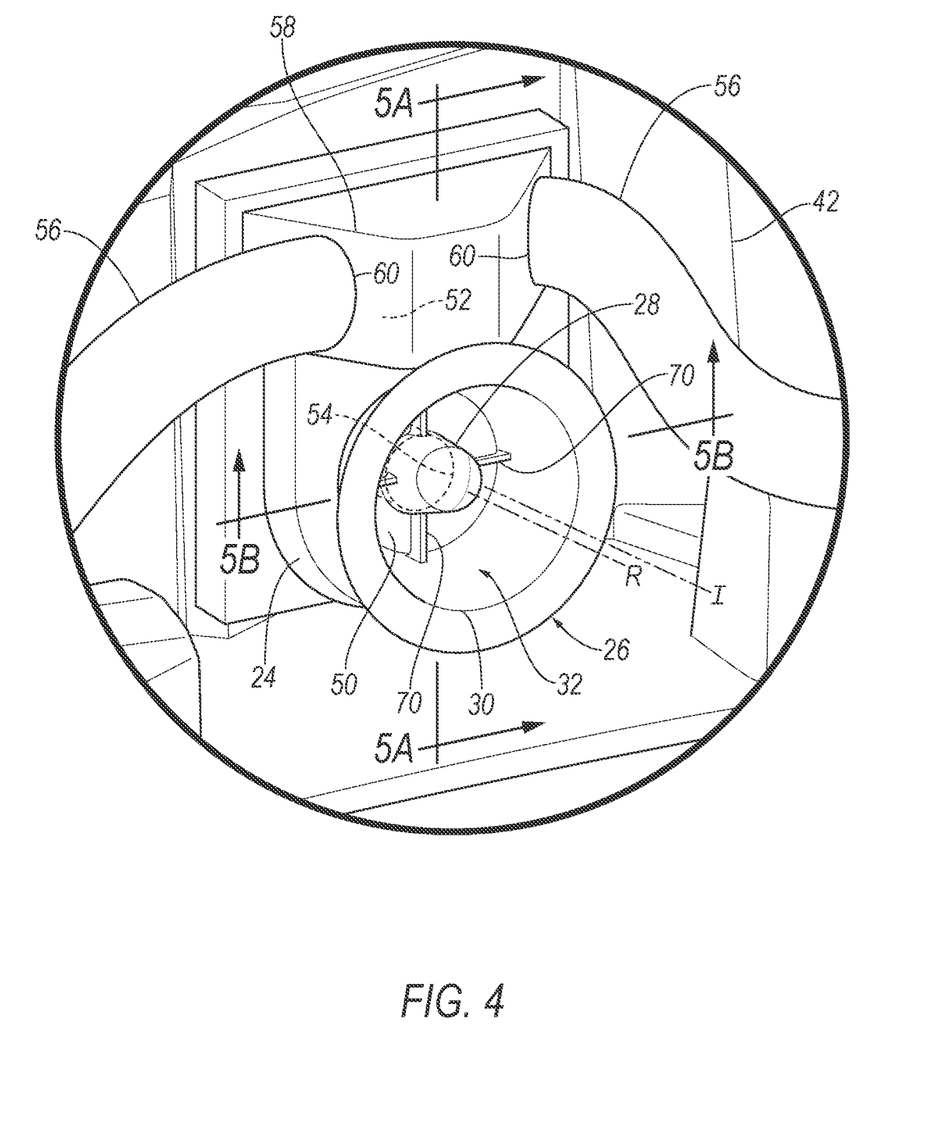
FIG. 4 is a perspective view of a velocity stack mounted to a blower.

Turning now to FIG. 4, the blower 24 is supported by the housing lower piece 42. For example, the blower 24 may be mounted to the housing lower piece 42. For example, the blower 24 may include locating elements, fasteners, etc., that engage the housing lower piece 42. Additionally, or alternatively, fasteners may engage the blower 24 and the housing lower piece 42 to mount the blower 24 to the housing lower piece 42. The blower 24 may be spaced from the sensor 18 in the chamber 16. The sensor assembly 12 may include any suitable number of blowers 24.

The blower 24 is configured to move air, e.g., between an intake 50 and an exhaust 52, towards the sensor 18. That is, the blower 24 is configured to draw air via the intake 50 and exhaust air via the exhaust 52 towards the sensor 18. The intake 50 of the blower 24 is in fluid communication with the air inlet 48, and the exhaust 52 of the blower 24 is in fluid communication with a duct 56. That is, the blower 24 pulls air from the chamber 16 and urges air to flow out of the exhaust 52, through the duct 56, to (and out of) the air nozzle 22, and across the lens 20 of the sensor 18.

With continued reference to FIG. 4, the blower 24 may include a rotor 54, e.g., an electric motor, a fan, or other suitable structure for moving air. The rotor 54 defines a rotor axis R and is rotatable about the rotor axis R. The intake 50 of the blower 24 extends annularly about an intake axis I that is offset from the rotor axis R. That is, the rotor 54 and the intake 50 may be eccentric relative to each other. The rotor axis R and the intake axis I may be substantially parallel to each other. The intake 50 may extend entirely around the rotor 54.

The blower 24 may include a cover 58 in fluid communication with the exhaust 52. The cover 58 may cover the exhaust 52. For example, the cover 58 may be positioned to receive air exhausted from the exhaust 52 of the blower 24. The cover 58 may be coupled to the exhaust 52 and one or more ducts 56. For example, the cover 58 may include one or more openings 60 spaced from the exhaust 52 and coupled to one or more respective ducts 56. The cover 58 may direct air exhausted from the exhaust 52 through the opening(s) 60 into the respective ducts 56. That is, the cover 58 may be in fluid communication with one or more ducts 56 via the opening(s) 60. The cover 58 may be sealed around the exhaust 52 and the opening(s) 60, e.g., to reduce air leakage.

The blower 24 may be coupled to and in fluid communication with any suitable number of ducts 56, e.g., one or more. As one example, the blower 24 may be coupled to and in fluid communication with one duct 56. In such an example, the blower 24 may blow air into the duct 56, e.g., such that the blower 24 creates a positive pressure in the duct 56. As another example, the blower 24 may be coupled to and in fluid communication with two ducts 56, as shown in FIG. 2. In such an example, the blower 24 may blow air into both ducts 56, e.g., such that the blower 24 creates a positive and equal pressure in the two ducts 56.

The sensor assembly 12 may include any suitable number of blowers 24. The blowers 24 may be spaced from each sensor 18 in the chamber 16. For example, the sensor assembly 12 may include one blower 24 for each sensor 18. In such an example, each blower 24 may blow air across one respective sensor 18. As another example, the sensor assembly 12 may include fewer blowers 24 than sensors 18, as shown in FIG. 2. In such an example, at least some of the blowers 24 may blow air across a respective plurality of sensors 18.

Figure 5A:
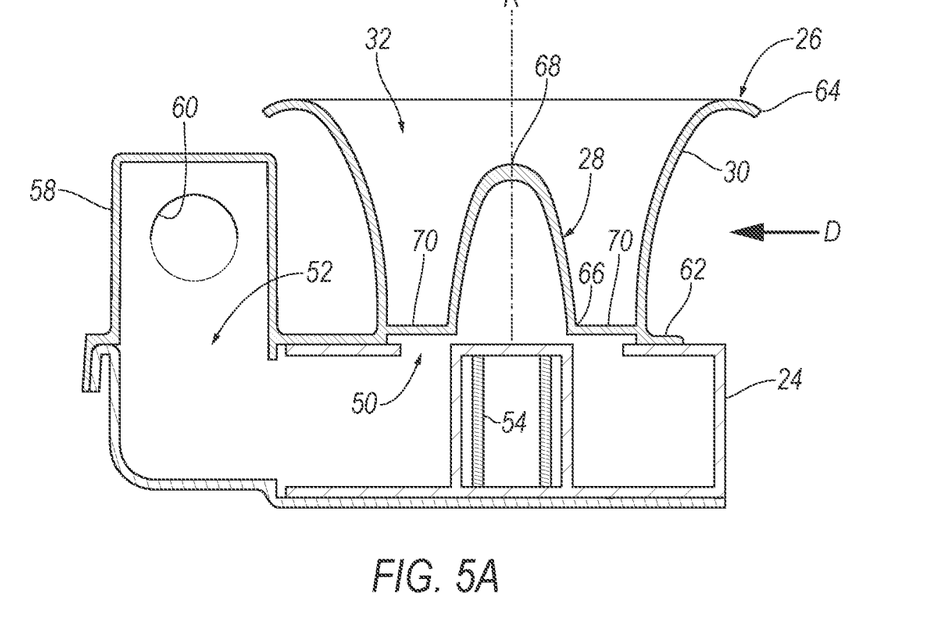
FIG. 5A is a cross-sectional view along line 5A in FIG. 4.

Turning now to FIG. 5A, the velocity stack 26 is mounted to the blower 24, as set forth above. Specifically, the outer wall 30 of the velocity stack 26 may be attached to the blower 24, e.g., via fasteners, adhesives, etc. The velocity stack 26 may be connected to the cover 58. For example, the outer wall 30 and the cover 58 may be monolithic. As another example, the outer wall 30 and the cover 58 may be formed separately and subsequently joined, e.g., via fasteners, adhesives, etc. Alternatively, the outer wall 30 may be spaced from the cover 58.

The velocity stack 26 may be positioned such that the outer wall 30 extends substantially perpendicular to a direction of airflow D through the air inlet 48 into the chamber 16. By extending substantially perpendicular to the direction of airflow D through the air inlet 48, the outer wall 30 can shield the intake 50 of the blower 24 from debris and/or liquid droplets. The sensor assembly 12 may include a same number of velocity stacks 26 as blowers 24. The velocity stack 26 is disposed in the chamber 16. The velocity stack 26 may be any suitable material, e.g., plastic, metal, etc.

Figure 5B:
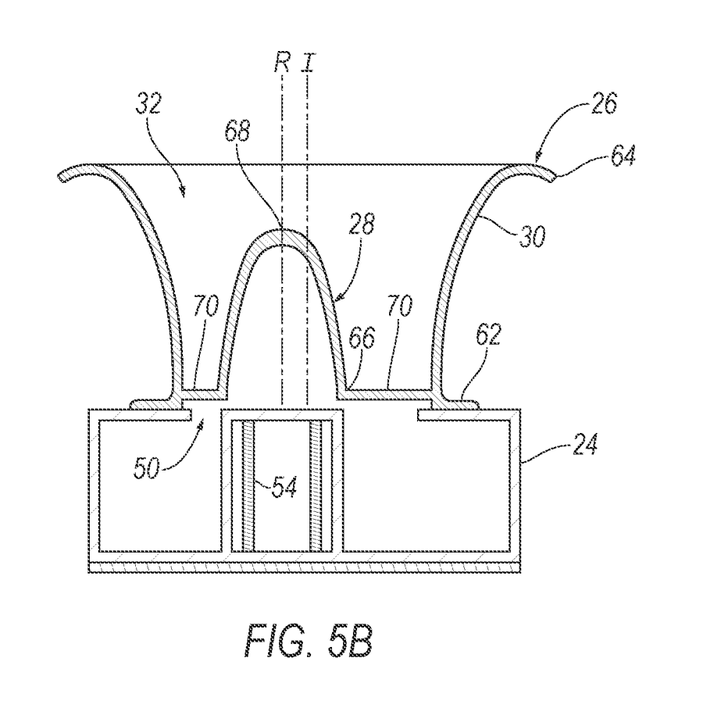
FIG. 5B is a cross-sectional view along line 5B in FIG. 4.

Turning now to FIG. 5B, the outer wall 30 may extend about the intake axis I. Specifically, the outer wall 30 may be centered on the intake axis I. The outer wall 30 may extend circumferentially about the intake axis I. The outer wall 30 may extend entirely around the intake 50 of the blower 24. That is, the intake 50 of the blower 24 may be disposed radially inward of the outer wall 30 relative to the intake axis I.

The outer wall 30 may extend away from the blower 24 along the intake axis I. For example, the outer wall 30 may include an inner edge 62 adjacent the blower 24 and an outer edge 64 spaced from the blower 24 along the intake axis I. The inner edge 62 of the outer wall 30 may abut the blower 24 and be attached to the blower 24, e.g., entirely around the intake 50 of the blower 24. For example, the inner edge 62 may be sealed to the blower 24 entirely around the intake 50, e.g., to reduce air leakage.

The outer wall 30 may have a conical frustum, i.e., horn, shape. Specifically, the outer wall 30 may taper along the intake axis I towards the blower 24. That is, a diameter at the outer edge 64 of the outer wall 30 may be greater than a diameter at the inner edge 62 of the outer wall 30.

With continued reference to FIG. 5B, the air foil 28 may extend about the rotor axis R. Specifically, the air foil 28 may be centered on the rotor axis R. That is, the air foil 28 may extend circumferentially about the rotor axis R. Said differently, the air foil 28 and the outer wall 30 may be eccentric relative to each other. The rotor axis R and the inlet axis I may be substantially aligned with each other relative to the blower 24, e.g., the rotor axis R and the inlet axis I may each extend from the blower 24 away from the housing lower piece 42. The intake 50 of the blower 24 may extend entirely around the air foil 28.

The air foil 28 extends away from the blower 24 along the rotor axis R. For example, the air foil 28 includes a base 66 and a tip 68 spaced from the base 66 along the rotor axis R. The air foil 28 may be spaced from the blower 24 along the rotor axis R. That is, the air foil 28 may be disposed between the outer edge 64 and inner edge 62 of the outer wall 30 relative to the rotor axis R. The tip 68 of the air foil 28 may be disposed between the outer edge 64 and the inner edge 62 of the outer wall 30 along the rotor axis R. That is, the outer wall 30 may extend farther along the intake axis I than the air foil 28 extends along the rotor axis R.

The air foil 28 may have a rounded cone shape. Specifically, the air foil 28 may taper along the rotor axis R away from the blower 24. That is, a diameter of the base 66 of the air foil 28 may be greater than a diameter of the tip 68 of the air foil 28. The air foil 28 may have any other suitable shape.

Figure 6:
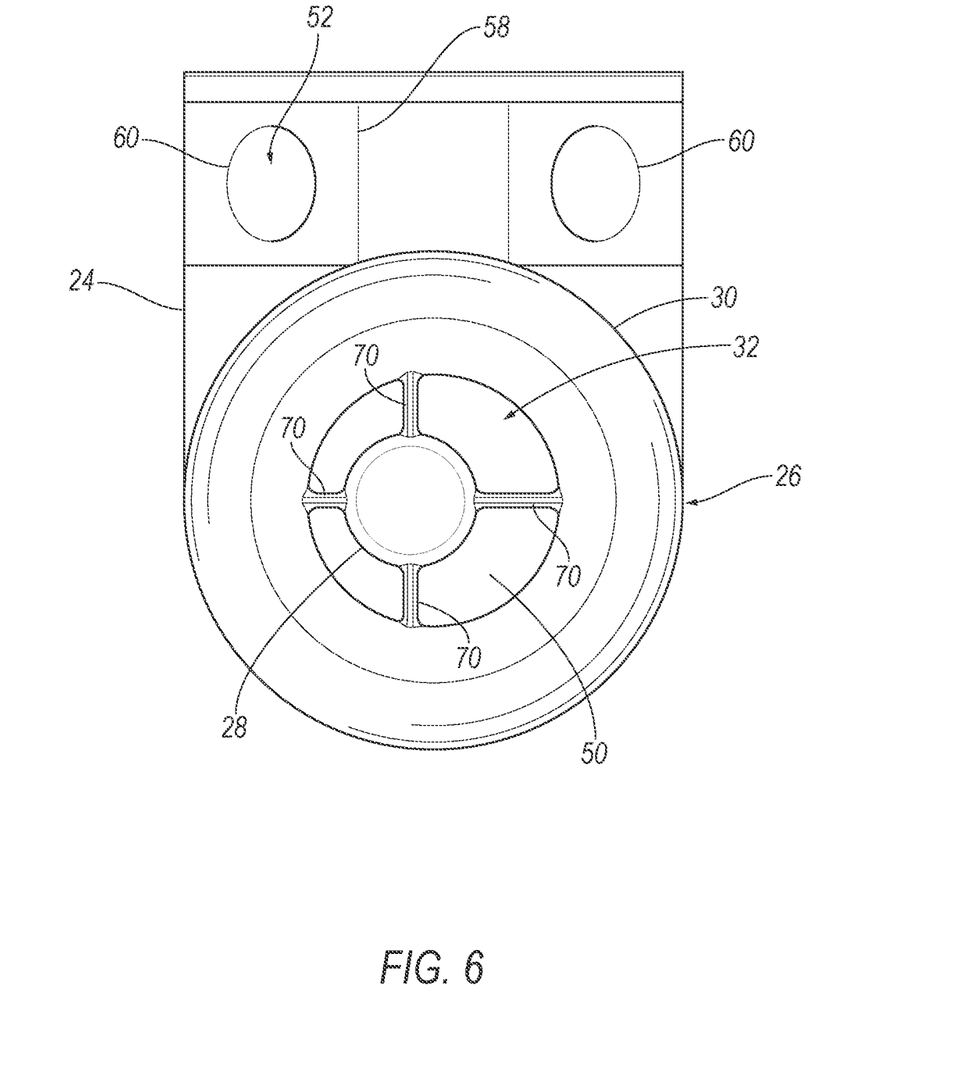
FIG. 6 is a top view of the velocity stack mounted to the blower.

With reference to FIGS. 5A-6, the channel 32 may extend annularly about the air foil 28. Specifically, the channel 32 may be substantially aligned with the intake 50 of the blower 24 about the air foil 28. The channel 32 may extend along the intake axis I from the inner edge 62 of the outer wall 30 towards the outer edge 64 of the outer wall 30, as shown in FIGS. 5A-5B.

With continued reference to FIGS. 5A-6, the velocity stack 26 includes a plurality of ribs 70 supporting the air foil 28. The plurality of ribs 70 may be spaced from each other about the air foil 28, as shown in FIG. 6. The plurality of ribs 70 extend from the air foil 28 to the outer wall 30. That is, the ribs 70 extend radially across the channel 32 relative to the rotor axis R.

Returning to FIG. 2, the duct 56 receives air from the blower 24, e.g., the exhaust, and directs air to the air nozzle 22. The duct 56 is disposed in the chamber 16. The duct 56 may be supported by the housing 14. For example, the duct 56 may be fixed to the housing lower piece 42, e.g., via fasteners, clips, adhesives, etc.

The duct 56 extends from the blower 24 to the air nozzle 22. The duct 56 defines a flow path from the blower 24 to the air nozzle 22. A cross-sectional area of the duct 56 normal to the flow path may, for example, be uniform from the blower 24 to the air nozzle 22 of the duct 56, e.g., to maintain a speed of the air flowing through the duct 56. As another example, the cross-sectional area may vary between blower 24 and the air nozzle 22, e.g., to change the speed of the air flowing through the duct 56.

The duct 56 is coupled to the blower 24, e.g., the exhaust. Specifically, the duct 56 is fluidly connected to the blower 24 such that air exhausted by the blower 24 enters the duct 56. The duct 56 is coupled to the air nozzle 22. Specifically, the duct 56 is fluidly connected to the air nozzle 22 such that air exhausted by the duct 56 enters the air nozzle 22. The sensor assembly 12 may include a same number of ducts 56 as sensors 18. The sensors 18 may be spaced from each other within the chamber 16 such that each duct 56 extends toward one respective sensor 18.

With continued reference to FIG. 2, the sensor assembly 12 includes the sensors 18 and the scanning sensor 34. The sensors 18 may detect the location and/or orientation of the vehicle 10. For example, the sensors 18 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 18 may detect the external world, e.g., objects and/or characteristics of surroundings of the vehicle 10, such as other vehicles, road lane markings, traffic lights and/or signs, pedestrians, etc. For example, the sensors 18 may include radar sensors, scanning laser range finders, light detection and ranging (LIDAR) devices, and image processing sensors such as cameras. The sensors 18 may include communications devices, for example, vehicle-to-infrastructure (V2I) or vehicle-to-vehicle 10 (V2V) devices.

The scanning sensor 34 may be disposed outside the housing 14. The scanning sensor 34 protrudes upward from the housing upper piece 40, as shown in FIGS. 1-3. The scanning sensor 34 may be a camera, a LIDAR device, a radar sensor, etc. The scanning sensor 34 is disposed above the housing lower piece 42 to have an unobstructed 360° horizontal field of view. For example, the scanning sensor 34 may be supported by the housing upper piece 40. In this situation, the scanning sensor 34 may extend at least partially through the housing upper piece 40 into the chamber 16, e.g., via the central opening 44. The scanning sensor 34 may be fixed relative to the housing upper piece 40 in the chamber 16, e.g., via fasteners, clips, etc. The scanning sensor 34 may be positioned laterally, i.e., along a left-right dimension relative to the vehicle 10, in a middle of the vehicle 10. The scanning sensor 34 may have a cylindrical shape defining an axis (not shown) that is oriented substantially vertically.

With continued reference to FIG. 2, the sensors 18 may be disposed in the housing 14, specifically in the chamber 16. The sensors 18 may be attached directly to the body panel 38 in the chamber 16, or the sensors 18 may be attached to the housing lower piece 42 in the chamber 16, which in turn is directly attached to the roof. The sensors 18 may be cameras arranged to collectively cover a 360° field of view with respect to a horizontal plane. Each sensor 18 has a field of view through the respective lens 20 and the respective aperture 46, and the field of view of one sensor 18 may overlap the fields of view of the sensors 18 that are circumferentially adjacent to one another, i.e., that are immediately next to each other.

Figure 7:
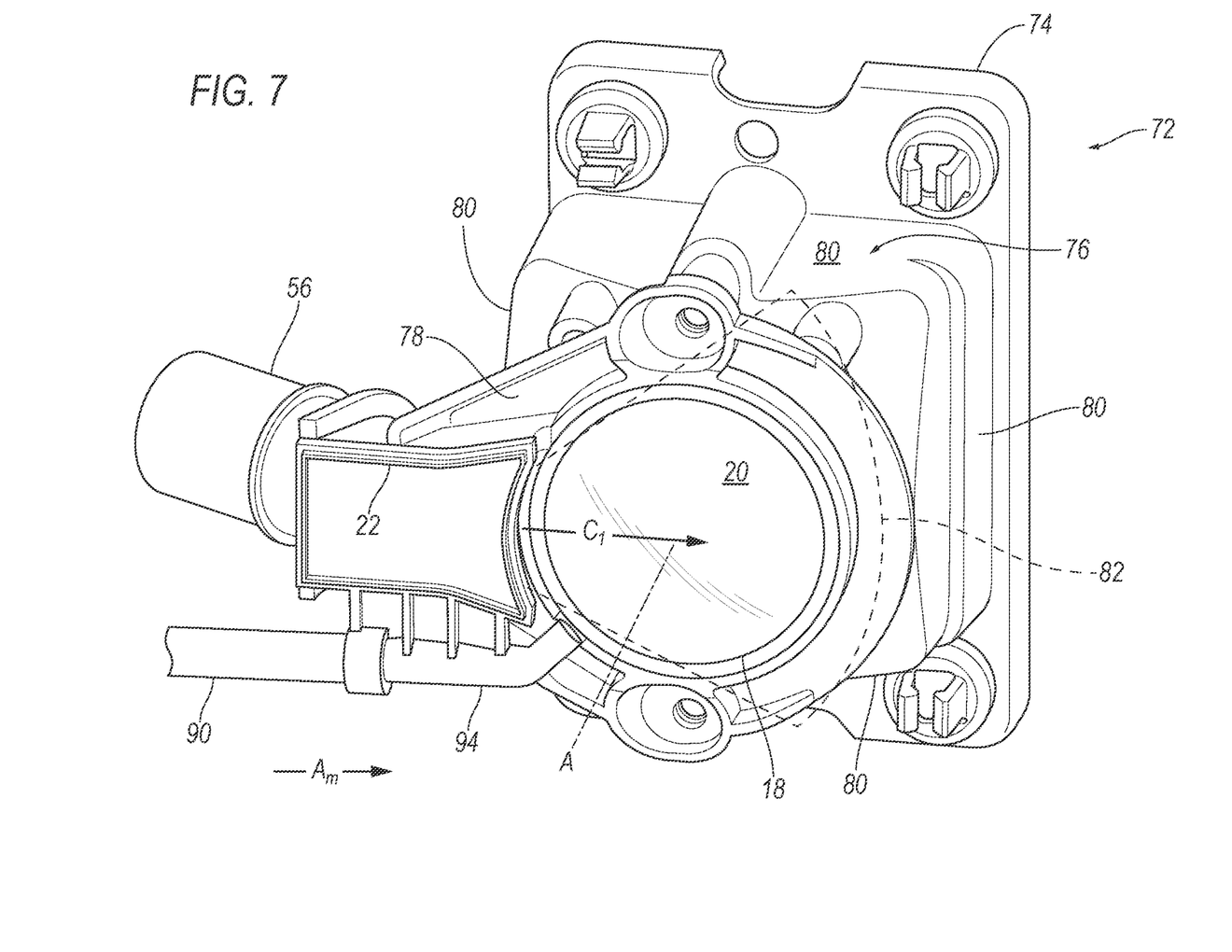
FIG. 7 is a perspective view of an air nozzle directing air across a lens of a sensor.

With reference to FIG. 7, the sensors 18 include respective lenses 20. Each lens 20 may define the field of view of the respective sensor 18 through the aperture 46. Each lens 20 may be convex. Each lens 20 defines an axis A, around which the lens 20 is radially symmetric. The axis A extends along a center of the field of view of the respective sensor 18.

The sensor assembly 12 may include a plurality of casings 72. Each casing 72 may be disposed in the chamber 16 and mounted to one respective sensor 18. The casing 72 extends completely around the sensor 18. That is, the casing 72 shields the sensor 18 from the chamber 16.

With continued reference to FIG. 7, each casing 72 may include a base portion 74, a tunnel portion 76, and a top panel 78. The tunnel portion 76 extends circumferentially around the axis A. For example, the tunnel portion 76 can include a plurality of flat panels 80, e.g., four flat panels 80, connected together in a circumferential loop around the axis A. The top panel 78 extends parallel to the lens 20, i.e., orthogonal to the axis A defined by the lens 20. The base portion 74 extends radially outward from the tunnel portion 76 relative to the axis A, and the top panel 78 extends radially inward from the tunnel relative to the axis A. The top panel 78 and the base portion 74 can be parallel to each other.

The casing 72 is attached to the sensor 18. Specifically, the base portion 74 of the casing 72 is attached to the sensor 18, and the rest of the casing 72 is not attached to the sensor 18. The base portion 74 is attached to the sensor 18 in any suitable manner, e.g., clips, fasteners, adhesive, etc. The tunnel portion 76 and the top panel 78 hang from the base portion 74 and extend around the lens 20 without being attached directly to the sensor 18 or the lens 20. This arrangement reduces vibrations experienced by the sensor 18.

With continued reference to FIG. 7, the air nozzle 22 may be mounted to the casing 72, specifically to the top panel 78. For example, the top panel 78 may include an overhanging portion extending radially outside the tunnel portion 76 relative to the axis A. The air nozzle 22 may be attached to the overhanging portion in any suitable manner, e.g., clips, fasteners, adhesive, etc.

The air nozzle 22 is aimed across and at the lens 20 so that air strikes the lens 20 at a shallow angle, e.g., less than 10°. Additionally, the air nozzle 22 may be aimed so that a direction of airflow from the air nozzle 22 is generally parallel to an ambient airflow $A_m$ during forward motion of the vehicle 10. That is, the air nozzles 22 may be aimed to direct airflow in various directions, e.g., based on a position of a respective sensor 18 relative to the vehicle 10. As used herein, "generally parallel" means that a horizontal component of the airflow from the air nozzle 22 is parallel to the ambient airflow $A_m$ during forward motion of the vehicle 10, even if the airflow from the air nozzle 22 has a vertical component that is transverse to the ambient airflow $A_m$. This arrangement can help minimize interference of the airflow from the air nozzle 22 by the ambient airflow $A_m$ during forward motion of the vehicle 10.

With continued reference to FIG. 7, the air nozzle 22 may be shaped to discharge air in a flat-fan pattern 82. For the purposes of this disclosure, a "flat-fan pattern" means that the discharge has an increasing width in one dimension as the discharge moves away from the air nozzle 22 and has a generally flat shape along a plane defined by the width and a direction of discharge $C_1$. The direction of discharge $C_1$ is directed along a center of the spray pattern, i.e., bisecting the flat-fan pattern 82. The direction of discharge $C_1$ of the air nozzle 22 is in a radially inward direction with respect to the axis A, i.e., a direction that is toward the axis A.

The spray pattern may cause the airflow from the air nozzle 22 to form an air curtain across the lens 20. For the purposes of this disclosure, an "air curtain" means a layer of moving air that has a width significantly greater than a thickness, that is close to a surface, and that is moving generally parallel to the surface. An air curtain can, for example, remove debris from the lens 20 as well as prevent debris from contacting the lens 20. As another example, the air curtain can dry, defog, and/or defrost the lens 20.

Figure 8:
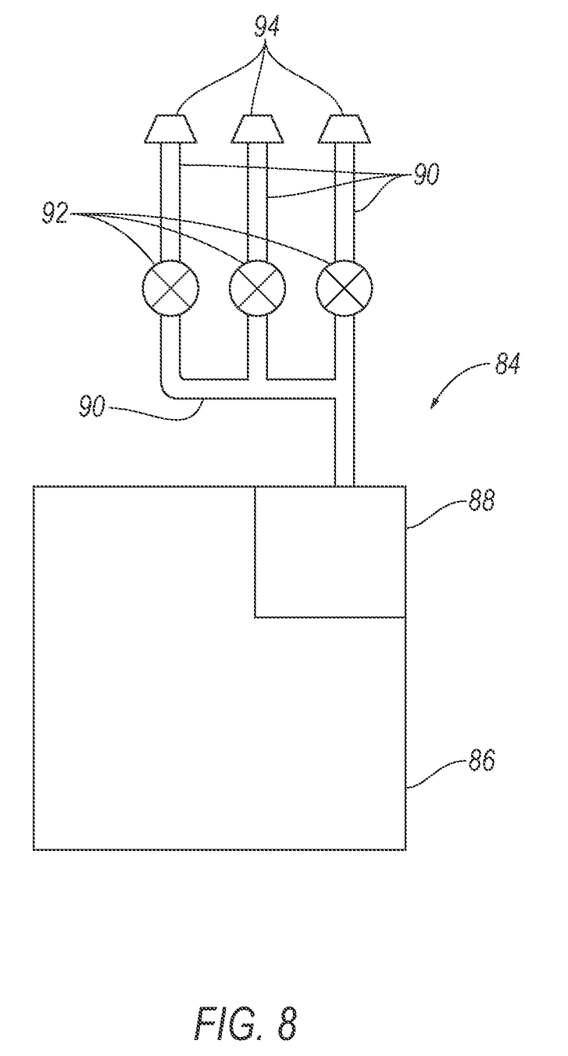
FIG. 8 is a diagram of an example cleaning system of the vehicle.

Turning now to FIG. 8, the vehicle 10 may include a liquid cleaning system 84. The liquid cleaning system 84 may include a reservoir 86, a pump 88, supply lines 90, valves 92, and fluid nozzles 94. The reservoir 86 and the pump 88 are fluidly connected (i.e., fluid can flow from one to the other) to each valve 92 and to each the fluid nozzle 94. The liquid cleaning system 84 distributes washer fluid stored in the reservoir 86 to the fluid nozzles 94. "Washer fluid" refers to any liquid stored in the reservoir 86 for cleaning. The washer fluid may include solvents, detergents, diluents such as water, etc.

The reservoir 86 may be a tank fillable with liquid, e.g., washer fluid for window cleaning. The reservoir 86 may be disposed in a front of the vehicle 10, specifically, in an engine compartment forward of a passenger cabin. Alternatively, the reservoir 86 may be disposed in the housing 14, e.g., in the chamber 16. The reservoir 86 may store the washer fluid only for supplying the sensor assembly 12 or also for other purposes, such as supply to the windshield.

The pump 88 forces the washer fluid through the supply lines 90 to the valves 92 and then to the fluid nozzles 94 with sufficient pressure that the washer fluid sprays from the fluid nozzles 94. The pump 88 is fluidly connected to the reservoir 86. The pump 88 may, for example, be attached to or disposed in the reservoir 86.

The supply lines 90 can extend from the pump 88 to the valves 92, and from the valves 92 to the fluid nozzles 94. A separate supply line 90 extends from each valve 92 to the respective fluid nozzle 94. The supply lines 90 may be, e.g., flexible tubes.

The valves 92 are independently actuatable to open and close, to permit the washer fluid to flow through or to block the washer fluid; i.e., each valve 92 can be opened or closed without changing the status of the other valves 92. Each valve 92 is positioned to permit or block flow from the reservoir 86 to a respective one of the fluid nozzles 94. The valves 92 may be any suitable type of valve, e.g., ball valve, butterfly valve, choke valve, gate valve, globe valve, etc.

Returning to FIG. 7, the fluid nozzles 94 may maintain clarity of a field-of-view of a respective sensor 18, e.g., liquid exiting the fluid nozzles 94 may clean the lenses 20 of the sensors 18. Each fluid nozzle 94 may be mounted to one respective casing 72, specifically to the top panel 78, e.g., the overhanging portion. The fluid nozzle 94 may be attached to the overhanging portion, e.g., in substantially the same manner as the air nozzle 22.

The fluid nozzle 94 is aimed across and at the lens 20 so that fluid strikes the lens 20 at a shallow angle, e.g., less than 10°. That is, the fluid nozzle 94 is aimed to direct fluid across the lens 20. Additionally, the fluid nozzle 94 may be aimed so that a direction of fluid from the fluid nozzle 94 is generally parallel to the ambient airflow $A_m$ during forward motion of the vehicle 10. This arrangement can help minimize interference of the fluid by the ambient airflow $A_m$ during forward motion of the vehicle 10.

The fluid nozzle 94 may be shaped to spray fluid in the flat-fan pattern (not shown). The fluid nozzle 94 has a direction of discharge (not shown) directed along a center of the spray pattern, i.e., bisecting the flat-fan pattern. The direction of discharge of the fluid nozzle 94 is in a radially inward direction with respect to the axis A. i.e., a direction that is toward the axis A.

The direction of discharge of the fluid nozzle 94 is different than, i.e., transverse to, the direction of discharge $C_1$ of the air nozzle 22. For example, the fluid nozzle 94 may be circumferentially spaced from the air nozzle 22 about the axis A. As one example, the fluid nozzle 94 may be oblique to the air nozzle 22. This arrangement may assist in positioning the fluid nozzle 94 such that the fluid nozzle 94 does not interfere with the airflow from the air nozzle 22 and that sprayed fluid can contact the lens 20 at the desired shallow angle.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A sensor assembly, comprising:
a housing defining a chamber, air being freely circulatable throughout the chamber;
a sensor disposed in the chamber and having a lens;
an air nozzle aimed to direct air across the lens;
a blower disposed in the chamber and in fluid communication with the air nozzle; and
a velocity stack mounted to the blower and including an air foil and an outer wall spaced from the air foil and extending entirely around the air foil, the air foil and the outer wall defining a channel therebetween;
the blower being in fluid communication with the chamber through the channel;
the channel being open to the chamber;
the housing including an air inlet open to an external environment and permitting air to enter the chamber from the external environment;
the velocity stack being spaced from the air inlet;
a first direction of airflow through the air inlet being horizontal; and
a second direction of airflow through the velocity stack being horizontal and substantially perpendicular to the first direction of airflow.

2. The sensor assembly of claim 1, wherein the air foil extends about a first axis and the outer wall extends about a second axis, the first axis being offset from the second axis.

3. The sensor assembly of claim 2, wherein the air foil has a rounded cone shape centered on the first axis.

4. The sensor assembly of claim 1, wherein the blower includes a rotor rotatable about a rotor axis, the air foil centered on the rotor axis.

5. The sensor assembly of claim 4, wherein the outer wall extends about a second axis offset from the rotor axis.

6. The sensor assembly of claim 4, wherein the blower includes an intake extending annularly about an intake axis offset from the rotor axis, the intake extending entirely around the air foil and the rotor.

7. The sensor assembly of claim 6, wherein the outer wall is centered on the intake axis, the outer wall extending circumferentially about the intake.

8. The sensor assembly of claim 6, wherein the channel extends annularly about the air foil, the channel being substantially aligned with the intake about the air foil.

9. The sensor assembly of claim 1, wherein the outer wall is connected to the blower and the air foil is spaced from the blower.

10. The sensor assembly of claim 1, wherein the blower includes an exhaust having a cover, the velocity stack being connected to the cover.

11. The sensor assembly of claim 1, wherein the velocity stack includes a plurality of ribs extending across the channel from the air foil to the outer wall, the ribs being spaced from each other about the air foil.

12. The sensor assembly of claim 1, wherein the outer wall includes a bottom connected to the blower and a top spaced from the blower along an axis, the channel extending from the bottom towards the top of the outer wall.

13. The sensor assembly of claim 12, wherein the air foil includes a tip disposed between the top and the bottom of the outer wall along the axis.

14. The sensor assembly of claim 1, wherein the channel extends annularly about the air foil.

15. The sensor assembly of claim 1, wherein the air nozzle is shaped to discharge air in a flat-fan pattern.

16. The sensor assembly of claim 1, wherein the sensor is spaced from the blower.

17. The sensor assembly of claim 16, further comprising a duct disposed in the chamber and being coupled to the blower and the air nozzle.

18. The sensor assembly of claim 17, further comprising:
- a second sensor disposed in the chamber and having a second lens, the second sensor being spaced from the sensor and the blower;
- a second air nozzle aimed to direct air across the second lens; and
- a second duct disposed in the chamber and extending from the blower to the second air nozzle, the second duct being coupled to the blower and the second air nozzle.

19. The sensor assembly of claim 1, further comprising a fluid nozzle aimed to direct fluid across the lens.

20. The sensor assembly of claim 19, wherein the fluid nozzle is circumferentially spaced from the air nozzle about the lens.

* * * * *